United States Patent
Springman et al.

(10) Patent No.: US 10,297,356 B2
(45) Date of Patent: May 21, 2019

(54) STORAGE SYSTEM FOR NUCLEAR FUEL

(71) Applicant: Holtec International, Camden, NJ (US)

(72) Inventors: Richard M. Springman, Drexel Hill, PA (US); Stephen J. Agace, Voorhees, NJ (US); Krishna P. Singh, Hobe Sound, FL (US)

(73) Assignee: Holtec International

( * ) Notice: Subject to any disclaimer, the term of this patent is extended or adjusted under 35 U.S.C. 154(b) by 0 days.

(21) Appl. No.: 15/584,692

(22) Filed: May 2, 2017

(65) Prior Publication Data
US 2017/0236605 A1 Aug. 17, 2017

Related U.S. Application Data

(63) Continuation of application No. 14/912,754, filed as application No. PCT/US2015/027455 on Apr. 24, 2015, now Pat. No. 9,640,289.
(Continued)

(51) Int. Cl.
*G21F 5/008* (2006.01)
*G21F 5/06* (2006.01)
(Continued)

(52) U.S. Cl.
CPC .......... *G21F 5/008* (2013.01); *G21C 19/06* (2013.01); *G21F 5/06* (2013.01); *G21F 5/12* (2013.01);
(Continued)

(58) Field of Classification Search
CPC . G21F 5/008; G21F 5/12; G21F 5/012; G21F 5/00; G21F 5/06; G21F 5/015;
(Continued)

(56) References Cited

U.S. PATENT DOCUMENTS 4,171,002 A  10/1979 Smith
4,803,042 A   2/1989 Gilmore et al.
(Continued)

FOREIGN PATENT DOCUMENTS

DE  102012212006   9/2013
GB       1378681  12/1974
WO     2013155520  10/2013

OTHER PUBLICATIONS

Corresponding International Search Report for PCT/US2015/027455 dated Sep. 15, 2015.
(Continued)

*Primary Examiner* — Robert Poon
(74) *Attorney, Agent, or Firm* — The Belles Group, P.C.

(57) ABSTRACT

A fuel storage system for storing and drying nuclear fuel rods includes a vertically oriented capsule defining an internal cavity. A plurality of fuel rod storage tubes is disposed in the cavity. In one embodiment, each storage tube has a transverse cross section configured and dimensioned to hold no more than one fuel rod. Intact or damaged fuel rods may be stored in the storage tubes. After the fuel rods are loaded into the capsule, a lid is attached to a previously open top end of the capsule. In one embodiment, the lid may be sealed welded to the capsule for forming a gas tight enclosure. The interior of the capsule and multiple fuel rods contained therein may be dried together simultaneously via flow conduits formed in the lid that can be fluidly connected to a suitable drying process such as a forced gas dehydration system.

7 Claims, 19 Drawing Sheets

Related U.S. Application Data

(60) Provisional application No. 61/983,606, filed on Apr. 24, 2014.

(51) Int. Cl.
*G21F 9/34* (2006.01)
*G21C 19/06* (2006.01)
*G21F 5/12* (2006.01)
*G21F 5/14* (2006.01)

(52) U.S. Cl.
CPC .................. *G21F 9/34* (2013.01); *G21F 5/14* (2013.01); *G21Y 2002/104* (2013.01)

(58) Field of Classification Search
CPC .. G21F 5/10; G21F 9/34; G21C 19/06; G21C 19/07; G21C 19/40; G21C 7/32; G21C 15/02; G21C 3/10
USPC .................. 206/443; 376/272; 220/528, 555
See application file for complete search history.

(56) References Cited

U.S. PATENT DOCUMENTS

| | | |
|---|---|---|
| 2003/0194042 A1 | 10/2003 | Singh et al. |
| 2006/0251201 A1 | 11/2006 | Singh |
| 2008/0017644 A1* | 1/2008 | Wickland ................ G21F 5/005 220/319 |
| 2011/0108746 A1 | 5/2011 | Bara et al. |
| 2014/0039235 A1 | 2/2014 | Subiry |
| 2014/0219408 A1* | 8/2014 | Singh ..................... G21F 5/008 376/272 |
| 2014/0270043 A1 | 9/2014 | Lehnert et al. |
| 2015/0155064 A1 | 6/2015 | Leleu et al. |

OTHER PUBLICATIONS

Corresponding Supplementary European Search Report for Ep 15782253 dated Oct. 20, 2017.

* cited by examiner

STORAGE SYSTEM FOR NUCLEAR FUEL

CROSS-REFERENCE TO RELATED APPLICATIONS

This application is a continuation of U.S. patent application Ser. No. 14/912,754 filed Feb. 18, 2016, which is a U.S. national stage application under 35 U.S.C. § 371 of PCT Application No. PCT/US2015/027455, filed Apr. 24, 2015, which claims the benefit of U.S. Provisional Application No. 61/983,606 filed Apr. 24, 2014; the entireties of which are all incorporated herein by reference.

BACKGROUND

The present invention relates generally to nuclear fuel containment, and more particularly to a capsule and related method for storing or transporting individual nuclear fuel pins or rods including damaged rods.

Reactor pools store used fuel assemblies after removal and discharge from the reactor. The fuel assemblies and individual fuel rods therein may become damaged and compromised during the reactor operations, resulting in cladding defects, breaking, warping, or other damage. The resulting damaged fuel assemblies and rods are placed into the reactor pools upon removal and discharge from the reactor core. Eventually, the damaged fuel assemblies, rods, and/or fuel debris must be removed from the pools, thereby allowing decommissioning of the plants.

The storage and transport regulations in many countries do not allow storage or transport of damaged fuel assemblies without encapsulation in a secondary capsule that provides confinement. Due to the high dose rates of used fuel assemblies post discharge, encapsulating fuel assemblies is traditionally done underwater. Furthermore, some countries may require removal of individual damaged fuel rods from the fuel assembly and separate storage in such secondary capsules. Processes already exist for removing single rods from a used fuel assembly and encapsulation. Subsequent drying of damaged fuel after removal from the reactor pool using traditional vacuum drying is exceedingly challenging because water can penetrate through cladding defects and become trapped inside the cladding materials.

An improved fuel storage system and method for drying, storing, and transporting damaged fuel rods is desired.

BRIEF SUMMARY

A nuclear fuel storage system and related method are provided that facilitates drying and storage of individual fuel rods, which may be used for damaged and intact fuel rods and debris. The system includes a capsule that is configured for holding a plurality of fuel rods, and further for drying the internal cavity of the capsule and fuel rods stored therein using known inert forced gas dehydration (FGD) techniques or other methods prior to long term storage. Existing forced gas dehydration systems and methods that may be used with the present invention can be found in commonly owned U.S. Pat. Nos. 7,096,600, 7,210,247, 8,067,659, 8,266,823, and 7,707,741, which are all incorporated herein by reference in their entireties.

In one embodiment, a storage capsule for nuclear fuel rods includes: an elongated body defining a vertical centerline axis, the body comprising an open top end, a bottom end, and sidewalls extending between the top and bottom ends; an internal cavity formed within the body; a lid attached to and closing the top end of the body; and an array of axially extending fuel rod storage tubes disposed in the cavity; wherein each storage tube has a transverse cross section configured and dimensioned to hold no more than one fuel rod.

In one embodiment, a fuel storage system for storing nuclear fuel rods includes: an elongated capsule defining a vertical centerline axis, the capsule comprising a top end, a bottom end, and sidewalls extending between the top and bottom ends; an internal cavity formed within the capsule; a lid attached to the top end of the capsule, the lid including an exposed top surface and a bottom surface; an upper tubesheet and a lower tubesheet disposed in the cavity; a plurality of vertically oriented fuel rod storage tubes extending between the upper and lower tubesheets; and a central drain tube extending between the upper and lower tubesheets; wherein each storage tube has a transverse cross section configured and dimensioned to hold no more than one fuel rod.

A method for storing nuclear fuel rods is provided. The method includes: providing an elongated vertically oriented capsule including an open top end, a bottom end, and an internal cavity, the capsule further including a plurality of vertically oriented fuel rod storage tubes each having a top end spaced below the top end of the capsule, the storage tubes each having a transverse cross section configured and dimensioned to hold no more than a single fuel rod; inserting a first fuel rod into a first storage tube; inserting a second fuel rod into a second storage tube; attaching a lid to the top end of the capsule; and sealing the lid to the capsule to form a gas tight seal.

A method for storing and drying nuclear fuel rods includes: providing an elongated vertically oriented capsule including an open top end, a bottom end, and an internal cavity, the capsule further including a plurality of vertically oriented fuel rod storage tubes each having a top end spaced below the top end of the capsule, the storage tubes each having a transverse cross section configured and dimensioned to hold no more than a single fuel rod; inserting a fuel rod into each of the storage tubes; attaching a lid to the top end of the capsule, the lid including a gas supply flow conduit extending between top and bottom surfaces of the lid and a gas return flow conduit extending between the top and bottom surfaces of the lid; sealing the lid to the capsule to form a gas tight seal; pumping an inert drying gas from a source through the gas supply conduit into the cavity of the capsule; flowing the gas through each of the storage tubes; collecting the gas leaving the storage tubes; and flowing the gas through the gas return conduit back to the source.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

Figure 1:
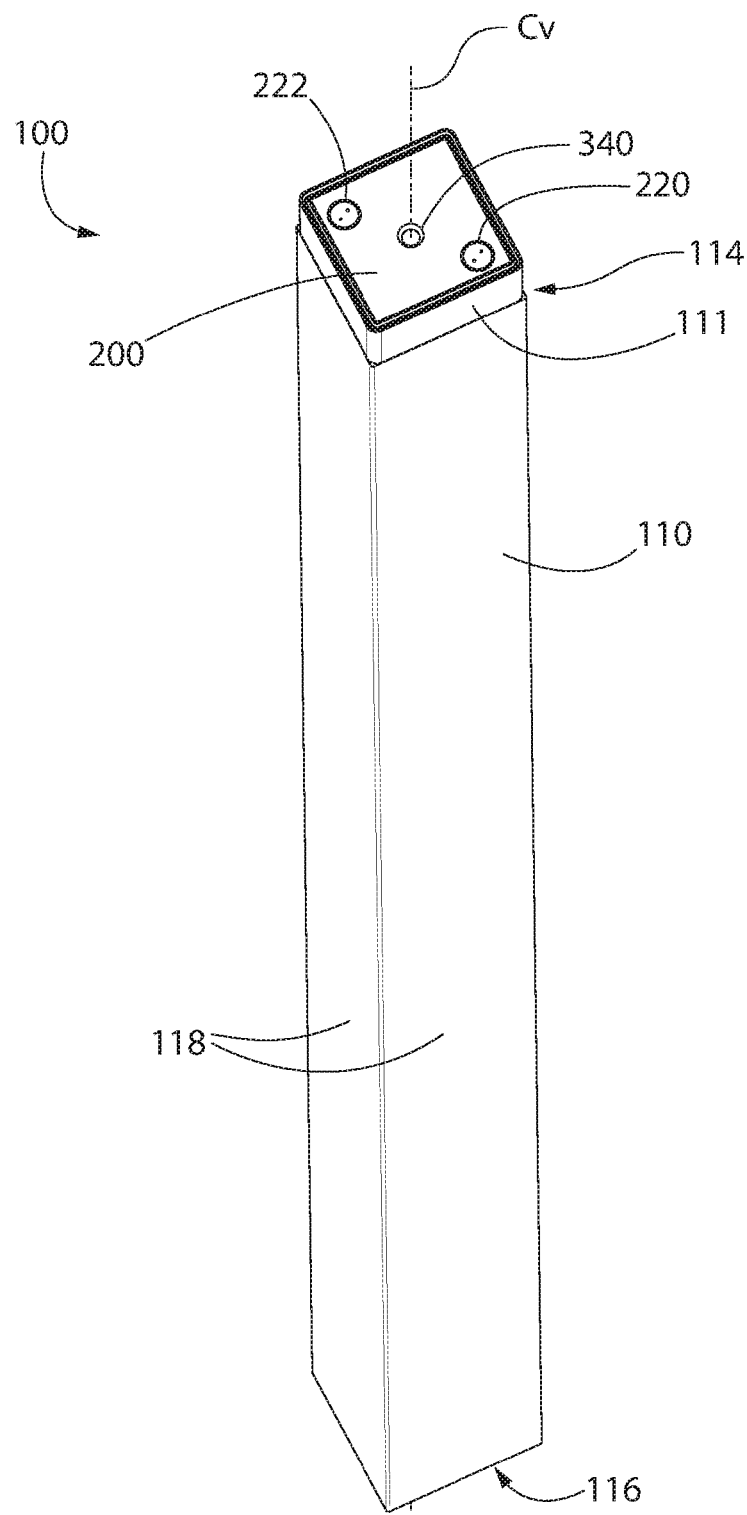
FIG. 1 is a perspective view of a fuel rod storage system comprising a capsule and sealable closure lid.
Figure 2:
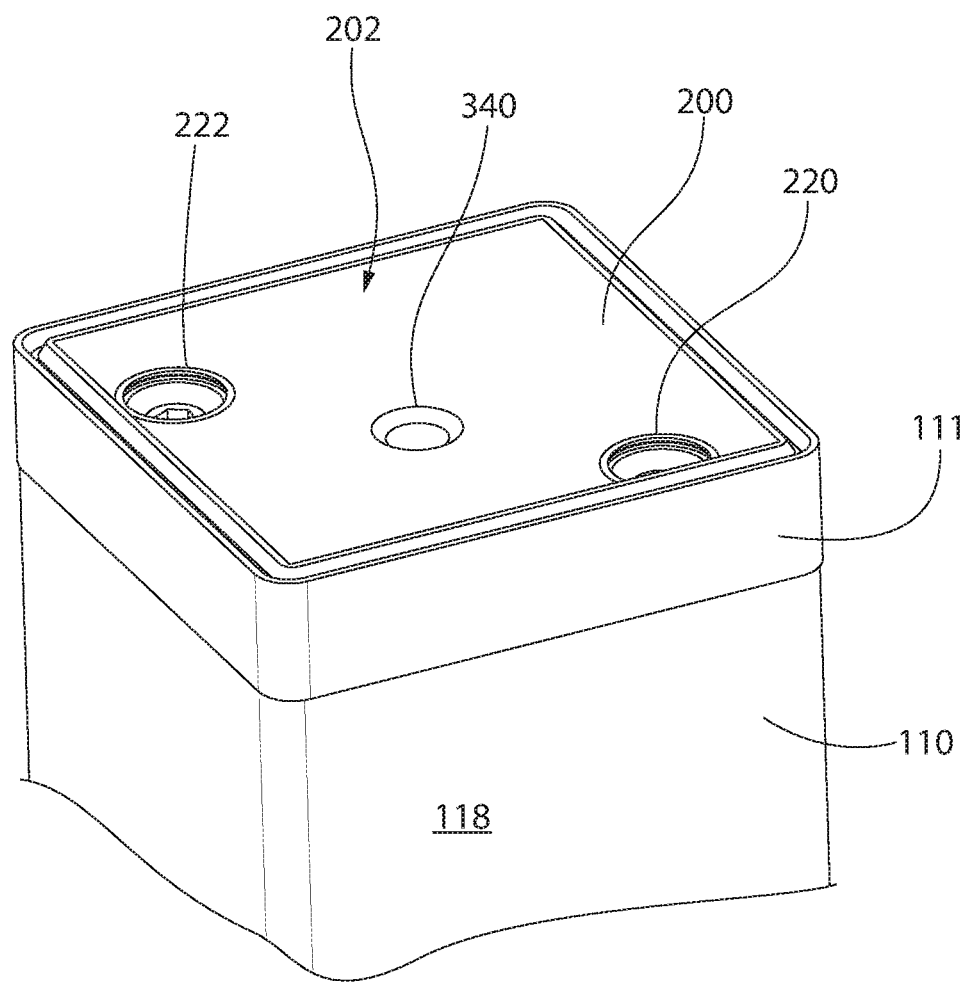
FIG. 2 is an enlarged view thereof showing the top end of the capsule and lid installed.
Figure 3:
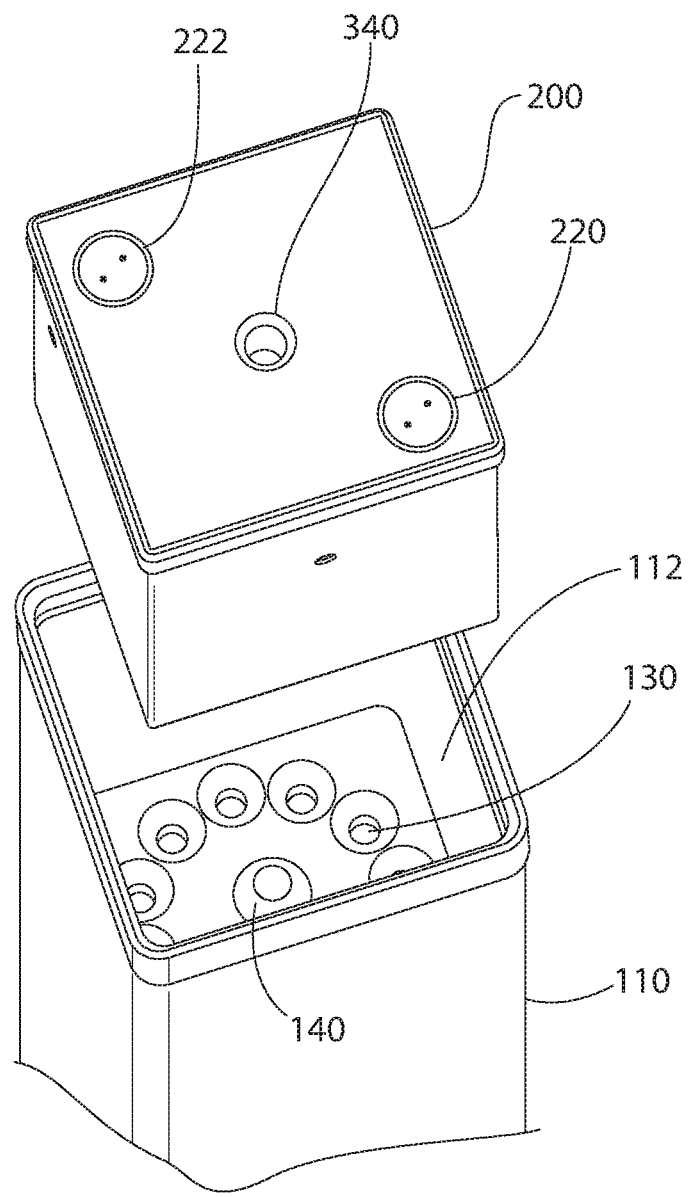
FIG. 3 is an enlarged view thereof showing the top end of the capsule and lid removed.
Figure 4:
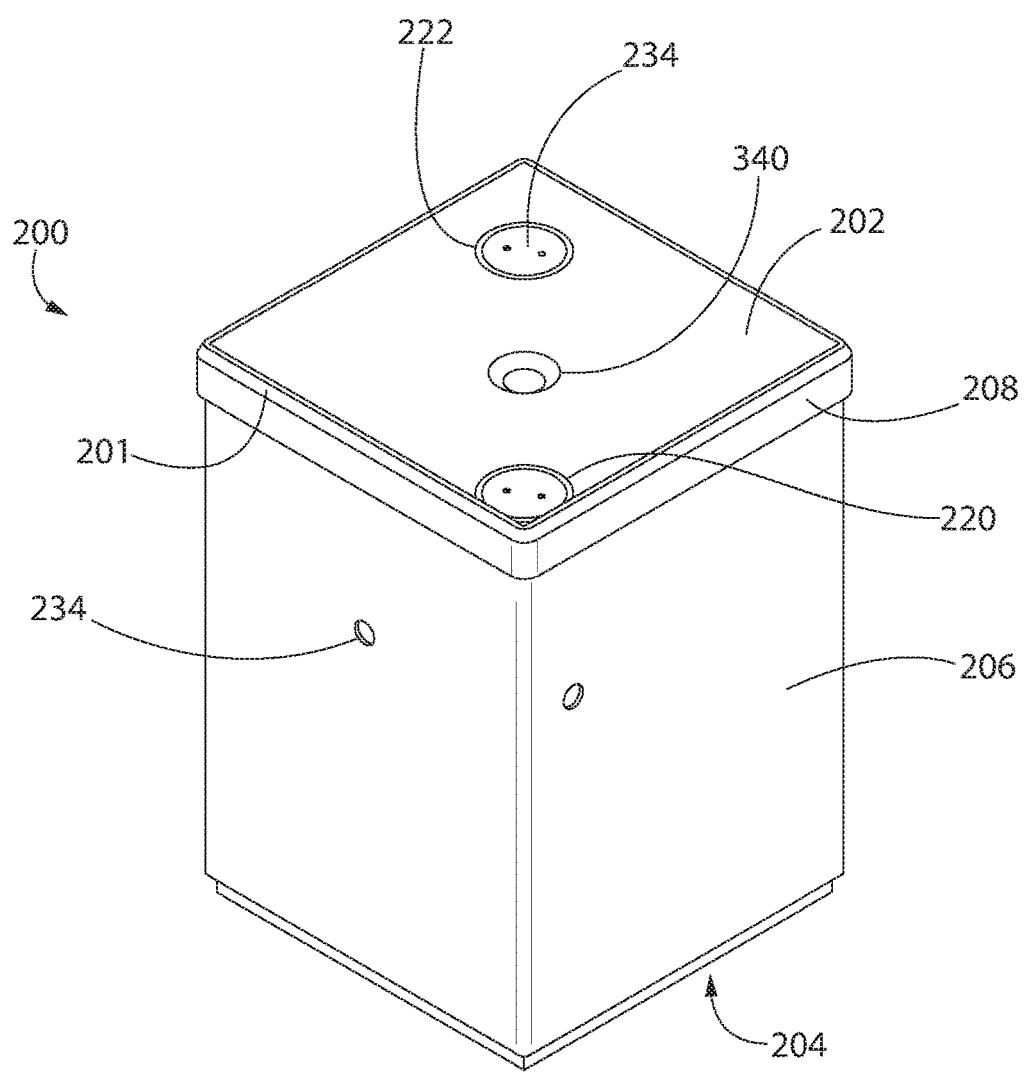
FIG. 4 is a top perspective view of the lid.

All drawings are schematic and not necessarily to scale.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

nuclear fuel assemblies (also referred to as "bundles" in the art) each comprise a plurality of fuel pins or rods mechanically coupled together in an array which is insertable as a unit into a reactor core. The fuel assemblies traditionally have a rectilinear cross-sectional configuration such as square array and contain multiple fuel rods. A reactor core contains multiple such fuel assemblies.

The fuel rods are generally cylindrical elongated metal tubular structures formed of materials such as zirconium alloy. The tubes hold a plurality of vertically-stacked cylindrical fuel pellets formed of sintered uranium dioxide. The fuel rod tubes have an external metal cladding formed of corrosion resistant material to prevent degradation of the tube and contamination of the reactor coolant water. The opposite ends of the fuel rod are sealed.

FIGS. 1-9B show a damaged nuclear fuel storage system 100 according to the present disclosure. The system includes a vertically elongated fuel rod enclosure capsule 110 configured to hold multiple damaged fuel rods and a closure lid 200 mounted thereto. The lid 200 is configured for coupling and permanent sealing to the capsule 200, as further described herein.

Capsule 110 has an elongated and substantially hollow body formed by a plurality of adjoining sidewalls 118 defining an internal cavity 112 that extends from a top end 114 to a bottom end 116 along a vertical centerline axis Cv. The bottom end 116 of the capsule is closed by a wall. The top end 114 of the capsule is open to allow insertion of the damaged rods therein. The sidewalls 118 are sold in structure so that the cavity 112 is only accessible through the open top end 114 before the lid is secured on the capsule.

In one embodiment, capsule 110 may have a rectilinear transverse cross-sectional shape such as square which conforms to the shape of a typical fuel assembly. This allows storage of the capsule 110 in the same type of radiation-shielded canister or cask used to store multiple spent fuel assemblies, for example without limitation a multi-purpose canister (MPC) or HI-STAR cask such as those available from Holtec International of Marlton, N.J. Such canisters or casks have an internal basket with an array of rectilinear-shaped openings for holding square-shaped fuel assemblies. It will be appreciated however that other shaped capsules 110 may be used in other embodiments and applications.

The body of the capsule 110 may be formed of any suitable preferably corrosion resistant material for longevity and maintenance of structural integrity. In one non-limiting exemplary embodiment, the capsule 110 may be made of stainless steel and have a nominal wall thickness of 6 mm.

Figure 11:
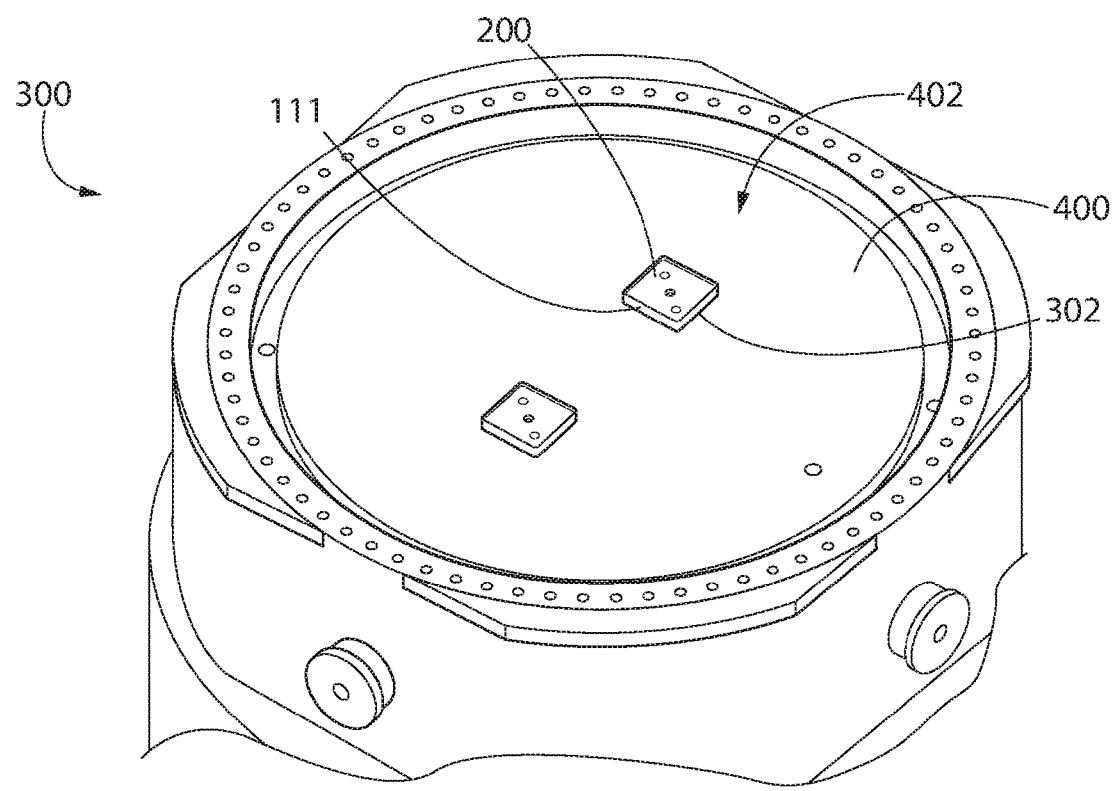
FIG. 11 is top perspective view of a lid of a transport cask with two fuel rod storage capsules mounted therein.
Figure 12:
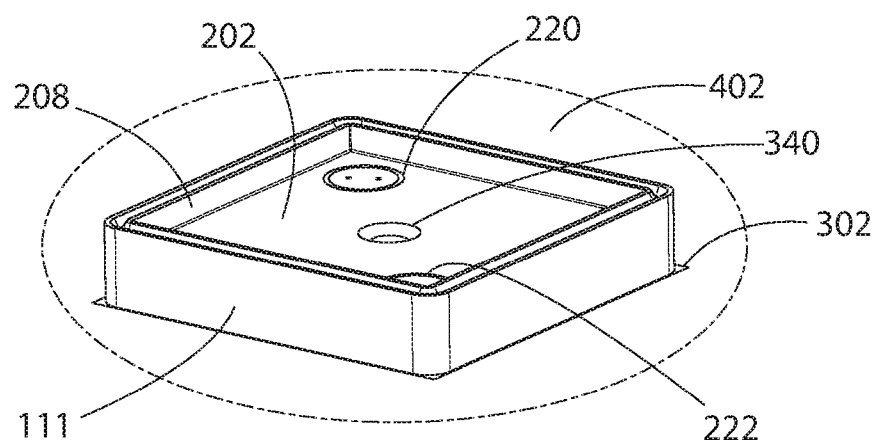
FIG. 12 is an enlarged perspective view of one of the capsules of FIG. 11.
Figure 13:
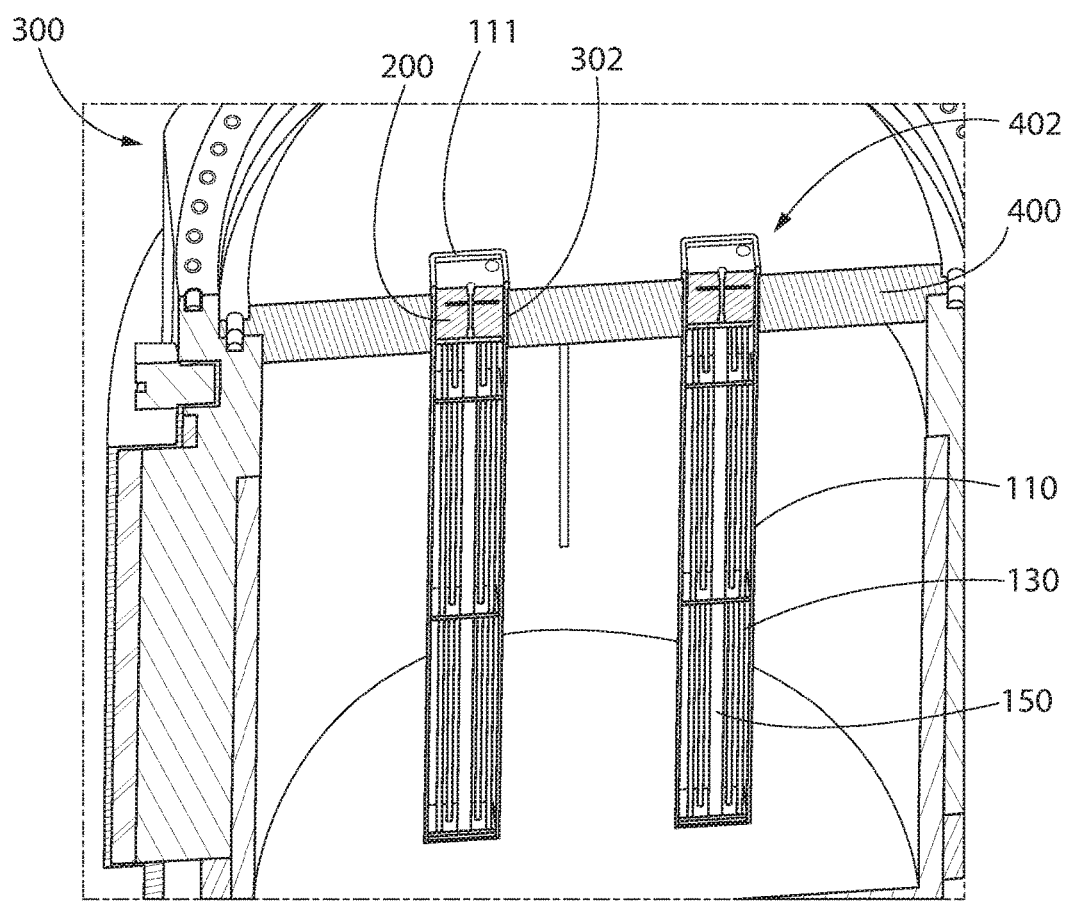
FIG. 13 is a cross-sectional perspective view of the transport cask of FIG. 11 showing the capsules.

In certain embodiments, the capsule 110 may further include a laterally enlarged mounting flange 111 disposed at and adjacent to the top end 114, as shown in FIGS. 1-3 and 7-9A. Mounting flange 111 extends laterally outwards from the sidewalls 118 on all sides and vertically downwards from top end 114 along the sidewalls for a short distance. The mounting flange 111 is configured and dimensioned to engage a mounting opening 302 formed in a storage canister 300, thereby supporting the entire weight of a loaded capsule 110 in a vertically cantilevered manner as shown in FIGS. 11-13 and further describe herein. In other embodiments, different methods may be used to support the capsule 110 in the storage canister and mounting flange 111 may be omitted.

Figure 15:
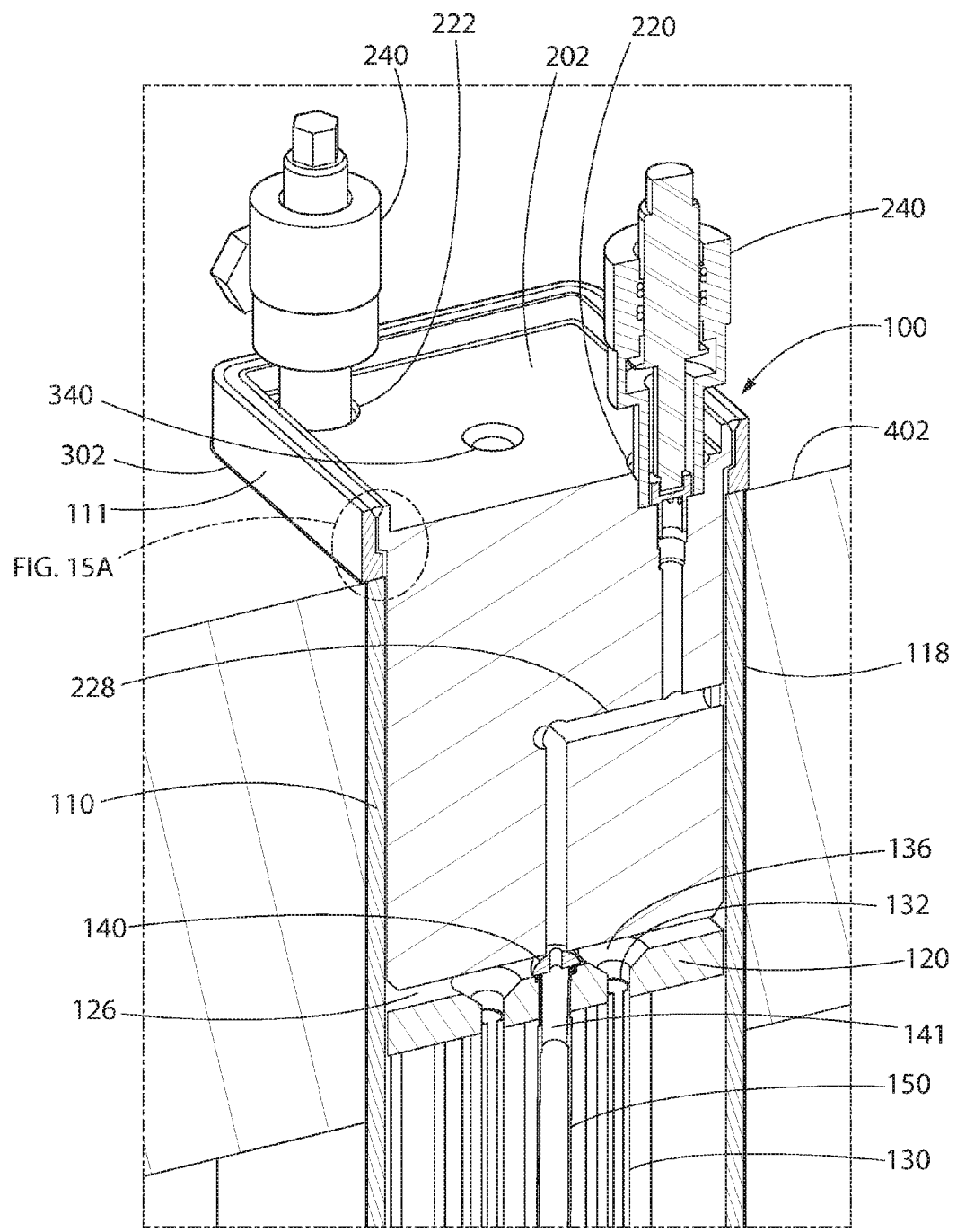
FIG. 15 is cross-sectional perspective view showing of FIGS. 11 and 14 showing one of the capsules mounted in the lid of the transport cask.

Referring now particularly to FIGS. 3, 7, 8 and 9A, the capsule 110 further includes an internal basket assembly configured to store and support a plurality of damaged fuel rods. The assembly includes an upper tubesheet 120 and lower tubesheet 122 spaced vertically apart therefrom. The upper and lower tubesheets are horizontally oriented. The lower tubesheet 122 is separated from the interior bottom surface 116a of bottom end 116 of the capsule 110 by a vertical gap to form a bottom flow plenum 124. The upper tubesheet 120 is spaced vertically downwards from the top end 112 of the capsule 110 by a distance D1 sufficient to form a top flow plenum 126 when the closure lid 200 is mounted on the capsule as shown in FIG. 15. Top plenum 126 is therefore formed between the bottom 204 of the lid 200 and top surface 128 of the upper tubesheet 120. Both the bottom and top plenums 124, 126 are part of flow paths used in conjunction with the gas fuel rod drying/dehydration process after the capsule is closed and sealed, as further described herein.

A plurality of fuel rod storage tubes 130 are each supported by the upper and lower tubesheets 120, 122 for holding the damaged (i.e. broken and/or leaking) fuel rods. In certain embodiments, intermediate supporting tubesheets or other support elements (not shown) may be used to provide supplementary support and lateral stability to the storage tubes 130 for seismic events. In one embodiment, the storage tubes 130 each have a diameter and internal cavity 131 with a transverse cross section configured and dimensioned to hold no more than a single fuel rod. Accordingly, the tubes 130 extend vertically along and parallel to the vertical centerline axis Cv of the capsule 110 from the upper tubesheet 120 to the lower tubesheet 122. Each of the tubes 130 is accessible through the upper tubesheet 120 (see, e.g. FIG. 9A). In one embodiment, the tubes 130 each have an associated machined lead-in guide in the upper tubesheet 120 to support the insertion of the fuel rods. An annular tapered or chamfered entrance 136 is therefore formed in the upper tubesheet 120 adjacent and proximate to the top open end 132 of each tube 130. The obliquely angled surface (with respect to the vertical centerline axis Cv) of the chamfered entranceways 136 help center and guide loading of the damaged fuel rods into each of the storage tubes 130. The top end 132 of the tubes may therefore be spaced slightly below the top surface 128 of the upper tubesheet 120 as shown.

The bottom ends 134 of the fuel rod storage tubes 130 may rest on the bottom interior surface 116a of the capsule 110. Each storage tube 130 includes one or more flow openings 133 of any suitable shape located proximate to the bottom ends 134 of the tubes below the bottom tubesheet 122. The openings 133 allow gas to enter the tubes from the bottom plenum 124 during the forced gas dehydration process and rise upward through the tubes to dry the damaged fuel rods.

The fuel rod storage tubes 130 may be mounted in the upper and lower tubesheets 120, 122 by any suitable method. In certain embodiments, the tubes 130 may be rigidly coupled to upper and/or lower tubesheets 120, 122 such as by welding, soldering, explosive tube expansion techniques, etc. In other embodiments, the tubes 130 may be movably coupled to the upper and/or lower tubesheets to allow for thermal expansion when heated by waste heat generated from the decaying fuel rods and heated forced gas dehydration. Accordingly, a number of possible rigid and non-rigid tube mounting scenarios as possible and the invention is not limited by any particular one.

The fuel rod storage tubes 130 may be arranged in any suitable pattern so long as the fuel rods may be readily inserted into each tube within the fuel pool. In the non-limiting exemplary embodiment shown, the tubes 130 are circumferentially spaced apart and arranged in a circular array around a central drain tube 150 further described below. Other arrangements and patterns may be used.

Referring now to FIGS. 7, 8, 9A, 9B, and 15, the central drain tube 150 of the capsule 110 may be mounted at approximately the geometric center of the upper tubesheet 120 as shown. The center drain tube 150 in one arrangement is supported by and extends vertically parallel to and coaxially with centerline axis Cv of the capsule from the upper tubesheet 120 to the bottom tubesheet 122. The drain tube 150 may be rigidly coupled to the tubesheets 120, 122 using the same techniques described herein for the fuel rod storage tubes. Drain tube 150 is a hollow structure forming a pathway for introducing insert drying gas into the tube assembly to dry the interior of capsule 110 following closure and sealing, as further described herein.

The drain tube 150 includes an open top end 151 and an open bottom end 152. The top end functions as a gas inlet and the bottom end functions as a gas outlet, with respect to the dehydration gas flow path further described herein. The bottom end 152 is open into and may extend slightly below the bottom surface of the lower tubesheet 122 to place the drain tube in fluid communication with the bottom plenum 124 of the capsule 110, as shown for example in FIGS. 9A-B. This forms a fluid pathway for introducing drying gas into the bottom of the capsule 110. The outlet end 152 of the drain tube 150 is spaced vertically apart from the interior bottom surface 116a of the capsule 110.

Drain tube 150 may include a sealing feature configured to form a substantially gas-tight seal between the closure lid 200 and drain tube for forced gas dehydration process. In one embodiment, the sealing feature may be a spring-biased sealing assembly 140 configured to engage and form a seal with the bottom of the closure lid 200 for gas drying. The sealing assembly 140 includes a short inlet tube 141, an enlarged resilient sealing member 142 disposed on top of the inlet tube, and spring 143. Inlet tube 141 has a length less than the length of the drain tube 150. Spring 143 may be a helical compression spring in one embodiment having a top end engaging the underside 142b of the sealing member 142 which extends laterally (i.e. transverse to vertical centerline axis Cv) and diametrically beyond the inlet tube 141, and a bottom end engaging the top surface 128 of the upper tubesheet 120. The inlet tube 141 is rigidly coupled to the sealing member 142 and has a diameter slightly smaller than the drain tube 150. This allows the lower portion of the inlet tube 141 to be inserted into the upper portion of the drain tube 150 through the top inlet end 151 for upward/downward movement in relation to the drain tube. Spring 143 operates to bias the sealing member 142 and inlet tube 141 assembly into an upward projected inactive position away from the upper tubesheet 120 ready to engage the closure lid 200, as further described herein. Accordingly, the sealing assembly 140 is axially movable along the vertical centerline axis from the upward projected inactive position to a downward active sealing position.

Figure 9A:
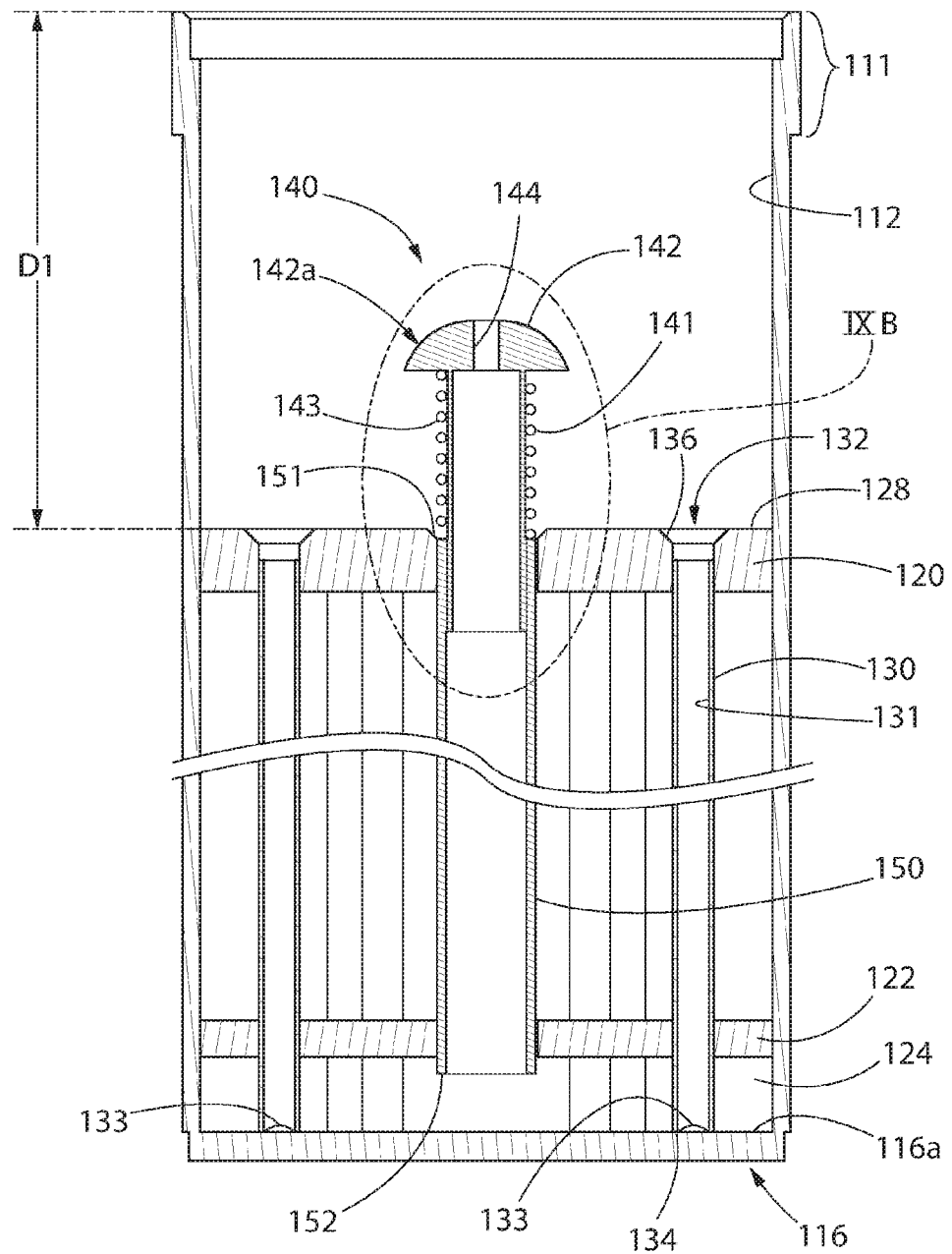
FIG. 9A is a side elevation cross-sectional view thereof.
Figure 9B:
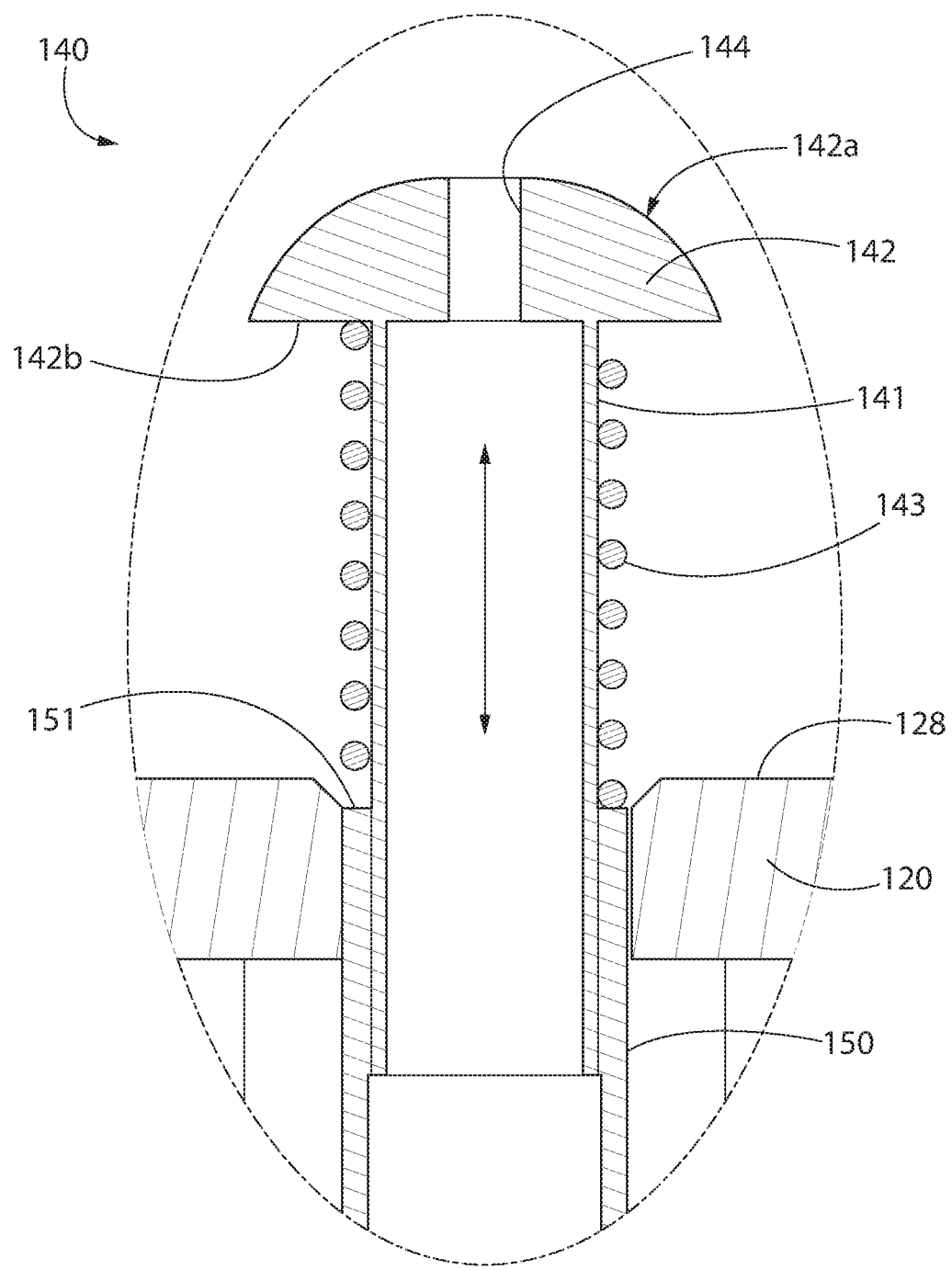
FIG. 9B is an enlarged detail taken from FIG. 9A.

In one embodiment, the sealing member 142 may have a circular shape in top plan view and a convexly curved or domed sealing surface 142a in side transverse cross-sectional view (see, e.g. FIGS. 9A and 9B). The curved sealing surface 142a ensures positive sealing engagement with a gas supply outlet extension tube 210 in the capsule closure lid 200 (see FIG. 6) to compensate for irregularities in the extension tube end surface edges and less than exact centering of the extension tube with respect to the sealing member 142, thereby preventing substantial leakage of drying gas when coupled together. The sealing member 142 includes a vertically oriented through-hole 144 to form a fluid pathway through the sealing member to the drain tube 150.

In one embodiment, the sealing member 142 may be made of a resiliently deformable elastomeric material suitable for the environment of a radioactive damaged fuel rod storage capsule. The elastomeric seal provides sufficient sealing and a leak-resistant interface between the central drain tube 150 and closure lid 200 to allow the inert drying gas (e.g. helium, nitrogen, etc.) to be pumped down the central drain tube to the bottom of the capsule 110 during the forced gas dehydration process.

It will be appreciated that other types of seals and arrangements may be used. Accordingly, in some embodiments metal or composite metal-elastomeric sealing members may be used. The sealing member may also have other configurations or shapes instead of convexly domed, such as a disk shaped with a flat top surface or other shape. In other embodiments, a non-spring activated sealing assembly may be used. Accordingly, the invention is not limited by the material of construction or design of the seal and sealing assembly so long as a relatively gas-tight seal may be formed between the closure lid gas outlet extension tube 210 and the drain tube 150 for forced gas dehydration of the capsule 110.

The fuel rod basket assembly, including the foregoing tubesheets, rod storage tubes, central drain tube, and sealing assembly may be made of any suitable preferably corrosion resistant material such as stainless steel. Other appropriate materials may be used.

The closure lid 200 will now be further described.

Referring to FIGS. 1-6 and 15, lid 200 in one embodiment may have a generally rectilinear cube-shaped body to complement the shape of cavity 112 in capsule 110 in which at least a portion of the lid is received. Accordingly, in one embodiment the lid 200 and capsule 110 may have a square shape in top plan view. Lid 200 further has a substantially solid internal structure except for the gas flow conduits formed therein, as further described below. The lid 200 is formed of a preferably corrosion resistant metal, such as stainless steel. Other materials may be used.

Lid 200 includes a top surface 202, bottom surface 204, and lateral sides 206 extending between the top and bottom surfaces. The lateral sides 206 of the lid have a width sized to permit insertion of a majority of the height of the lid into the cavity 112 of the capsule. The bottom of the lid 200 includes a peripheral skirt 212 extending around the perimeter of the bottom surface 204 that engages and rests on the top surface 128 of the upper tubesheet 120 of the capsule 110 when the lid is mounted in the capsule. In one embodiment, the skirt 212 is continuous in structure and extends around the entire perimeter without interruption. The skirt 212 projects downward for a distance from the bottom surface 204 of the lid which is recessed above the bottom edge 212a of the skirt. The forms a downwardly open space 211 having a depth commensurate with the height of the skirt 212. When the bottom edge 212a of skirt 212 rests on top surface 128 of the upper tubesheet 120, the top plenum 126 is formed between the bottom surface 204 of lid 200 and the upper tubesheet inside and within the skirt 212. The bottom edge 212a of the skirt 212 thereby forms a seal between the upper tubesheet 120 and lid 200 for forced gas dehydration of the capsule 110.

An enlarged seating flange 208 extends around the entire perimeter of the lid 200 adjacent to top surface 202 and projects laterally beyond the sides 206. The top surface 202 may be recessed below the top edge 208a of the seating flange 208 as shown. A stepped shoulder 213 is formed between seating flange 208 and sides 206 which engages and seats on a mating shoulder 113 formed inside the mounting flange 111 of capsule 110 in cavity 112 (see particularly FIG. 15A). Both mating shoulders 213 and 113 extend around the entire perimeter regions of the lid 200 and capsule 110 respectively and limit the insertion depth of the lid into the capsule.

Figure 10A:
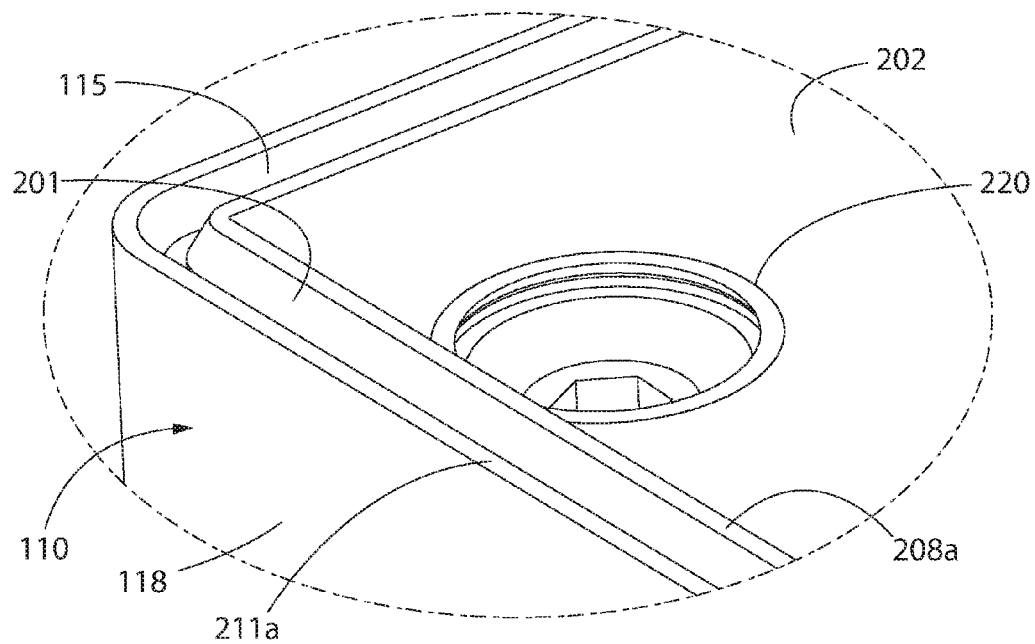
FIG. 10A is a detailed view of a top corner of the capsule showing the lid in place but not sealed and coupled to the capsule.
Figure 10B:
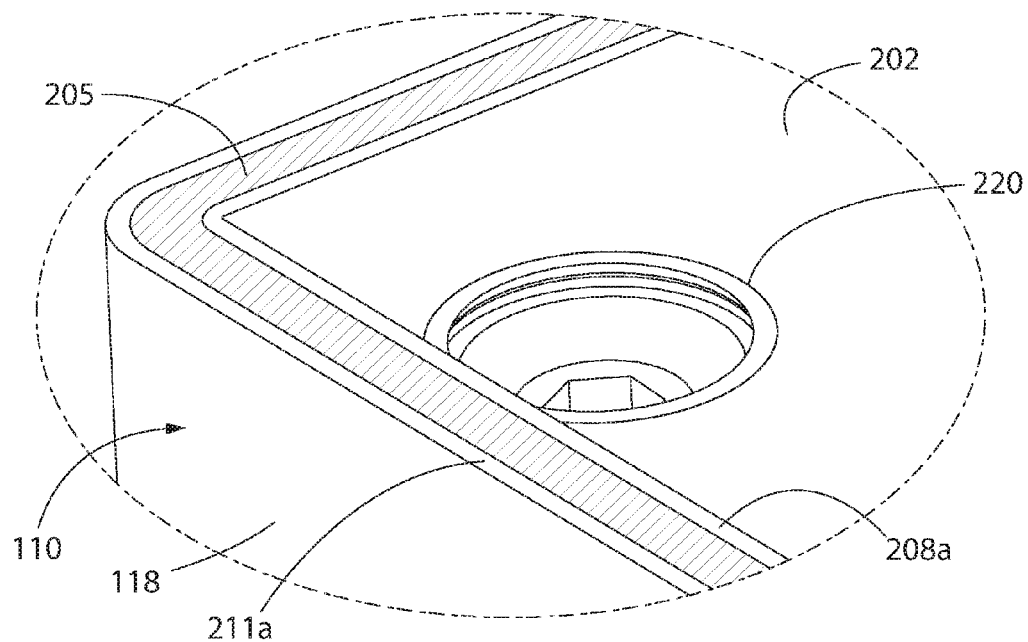
FIG. 10B is a view thereof showing the formation of a seal weld to couple to the lid to the capsule.
Figure 15A:
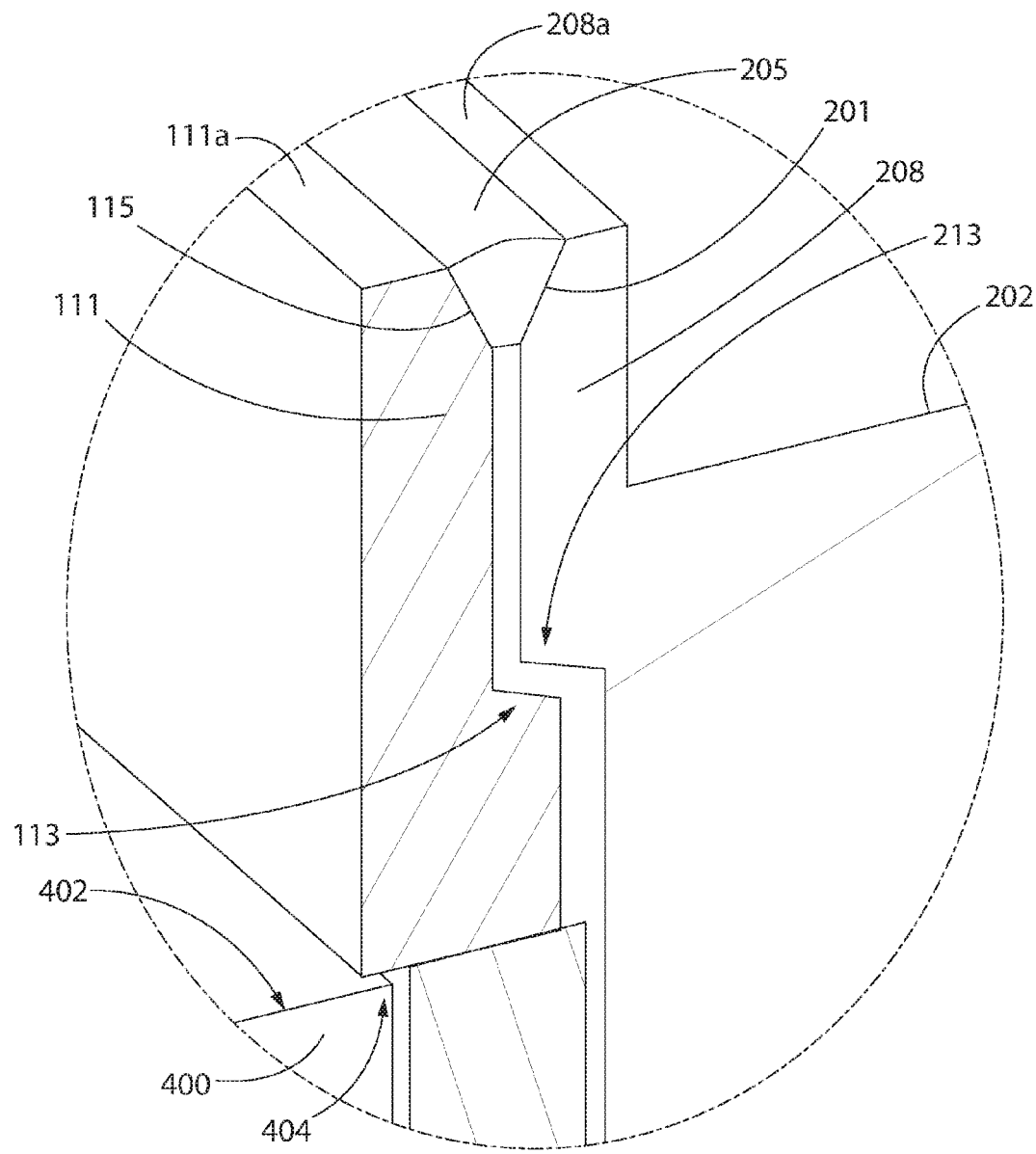
FIG. 15A is an enlarged view from FIG. 15 showing the mounting and weld detail coupling the lid to the top end of the capsule.

In one embodiment, the top edges 111a and 208a of the mounting flange 111 and seating flange 208 respectively are flush with each other and lie in approximately the same horizontal plane when the closure lid 200 is fully mounted in the capsule 110 (see, e.g. FIGS. 10A, 10B, and 15A). This facilitates formation of an open V-groove weld 205 to hermetically seal the lid to the capsule. The mounting and seating flanges 111, 208 each include opposing beveled faces 115, 208 respectively to form the V-groove. Because of the recessed top surface 202 of the lid 200 and mounting flange 111, access is available to both sides of finished weld which advantageously permits full volumetric inspection of the weld such as by ultrasonic non-destructive testing or other methods. The source and detector of the ultrasonic test (UT) equipment may therefore be placed on opposite sides of the weld for full examination. A multi-pass welding process may be used which prevents any potential through-cracking of a single weld line in the case of an undetected defect. This parallels welding processes used in the United States for Multi-Purpose Canisters (MPCs), but is modified to allow volumetric weld examination (a key consideration for acceptance of weld integrity by some international regulators). Each pass is followed by a Liquid Penetrant Test (LPT) to identify defects in the weld layer as the weld is formed. The finished weld is then volumetrically tested using UT. Unlike a bolted joint sealed with gaskets, a welded joint with volumetric inspection typically does not require leak-monitoring or checks prior to future transport. FIGS. 10A and 10B show the lid 200 and capsule 110 before and after welding, respectively. This does not limit the capsule to having a bolted lid, similar to dual-purpose metal casks used for storage and transport of spent nuclear fuel. In such embodiment, the capsule would have one more seals, for example elastomeric or metallic, that would be compressed during tightening of the lid bolts on the capsule, forming a hermetic seal.

According to another aspect of the invention, the closure lid 200 is configured to permit forced gas dehydration of the capsule 110 and plurality of damaged fuel rods contained therein after the lid is seal welded to the capsule. Accordingly, the lid 200 includes a combination of gas ports and internal fluid conduits to form a closed flow loop through capsule 110. Referring now to FIGS. 1-6 and 15, lid 200 includes a gas supply port 220 and gas return port 222 formed in the top surface 202 of the lid, and a gas supply outlet 224 and gas return inlet 226 formed in the bottom surface 204 of the lid. In one configuration, the gas supply outlet 224 and return inlet 226 may be located at diagonally opposite corner regions of the top surface 202 of the lid 200 proximate to the lateral sides 206. The gas supply port 220 is fluidly coupled to the gas supply outlet 224 via an internal flow conduit 228. The gas return port 222 is fluidly coupled to the gas return inlet 226 via another separate internal flow conduit 230 which is fluidly isolated from flow conduit 228.

Figure 5:
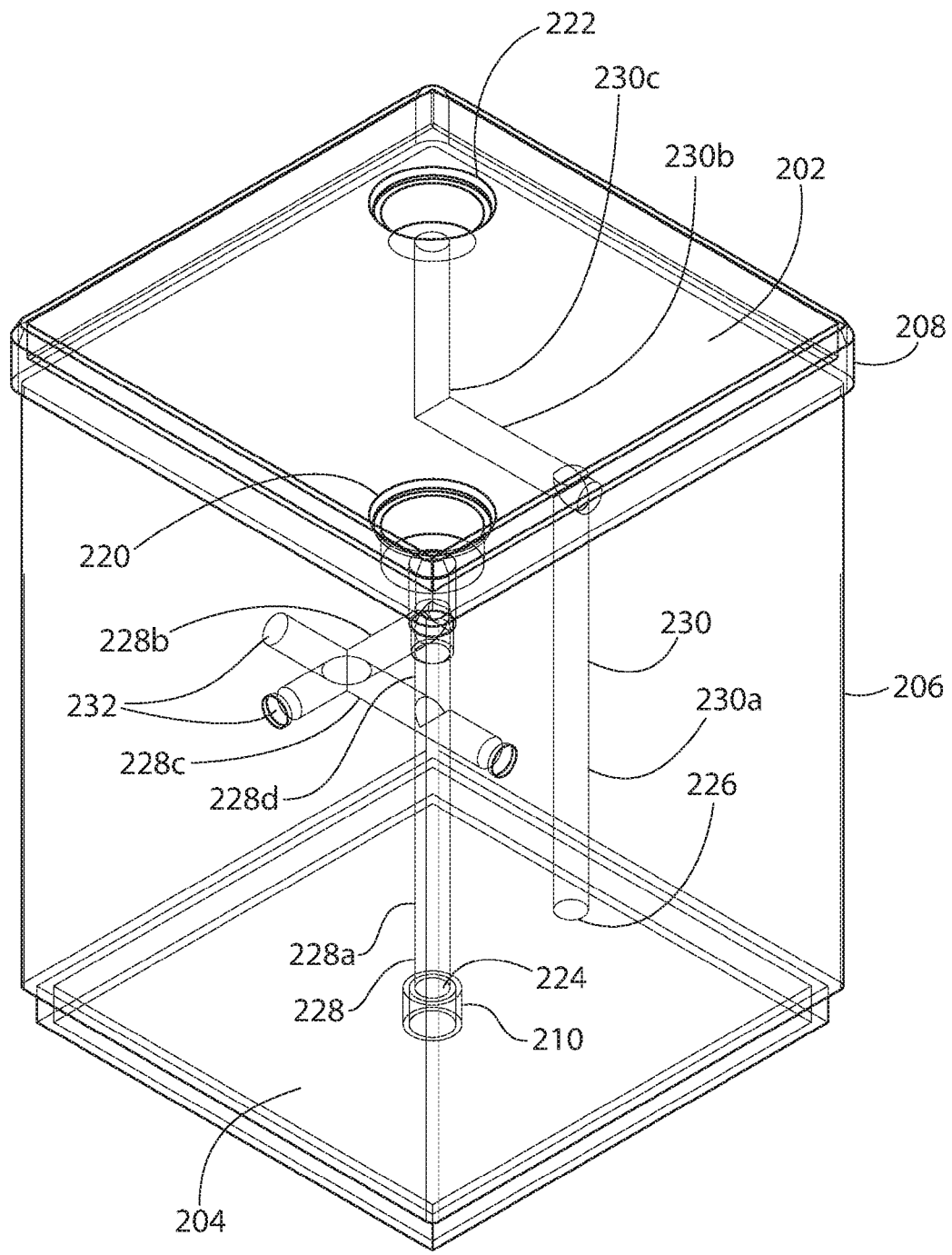
FIG. 5 is a perspective view thereof showing internal flow conduits formed in the lid.
Figure 6:
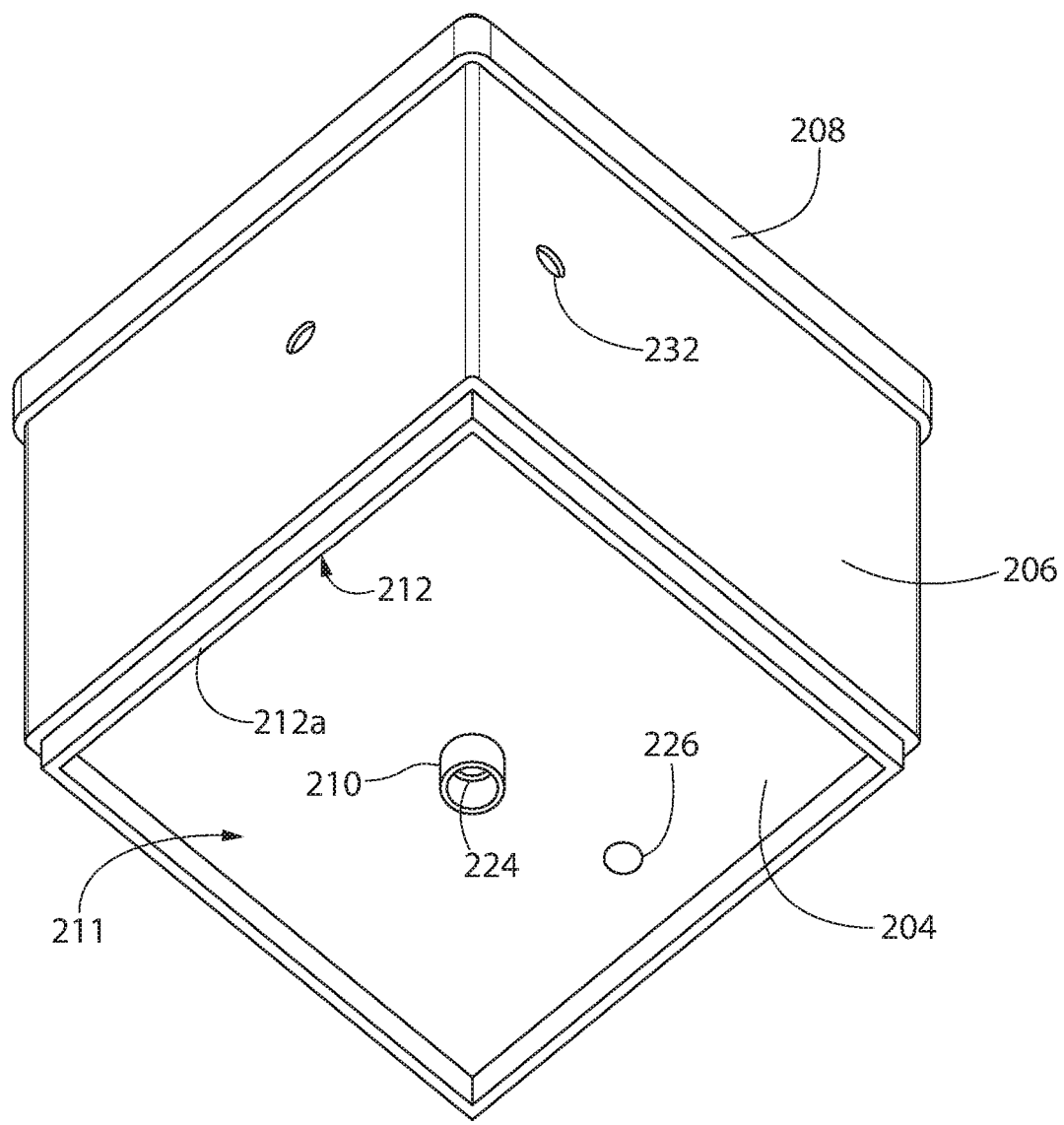
FIG. 6 is a bottom perspective view of the lid.
Figure 7:
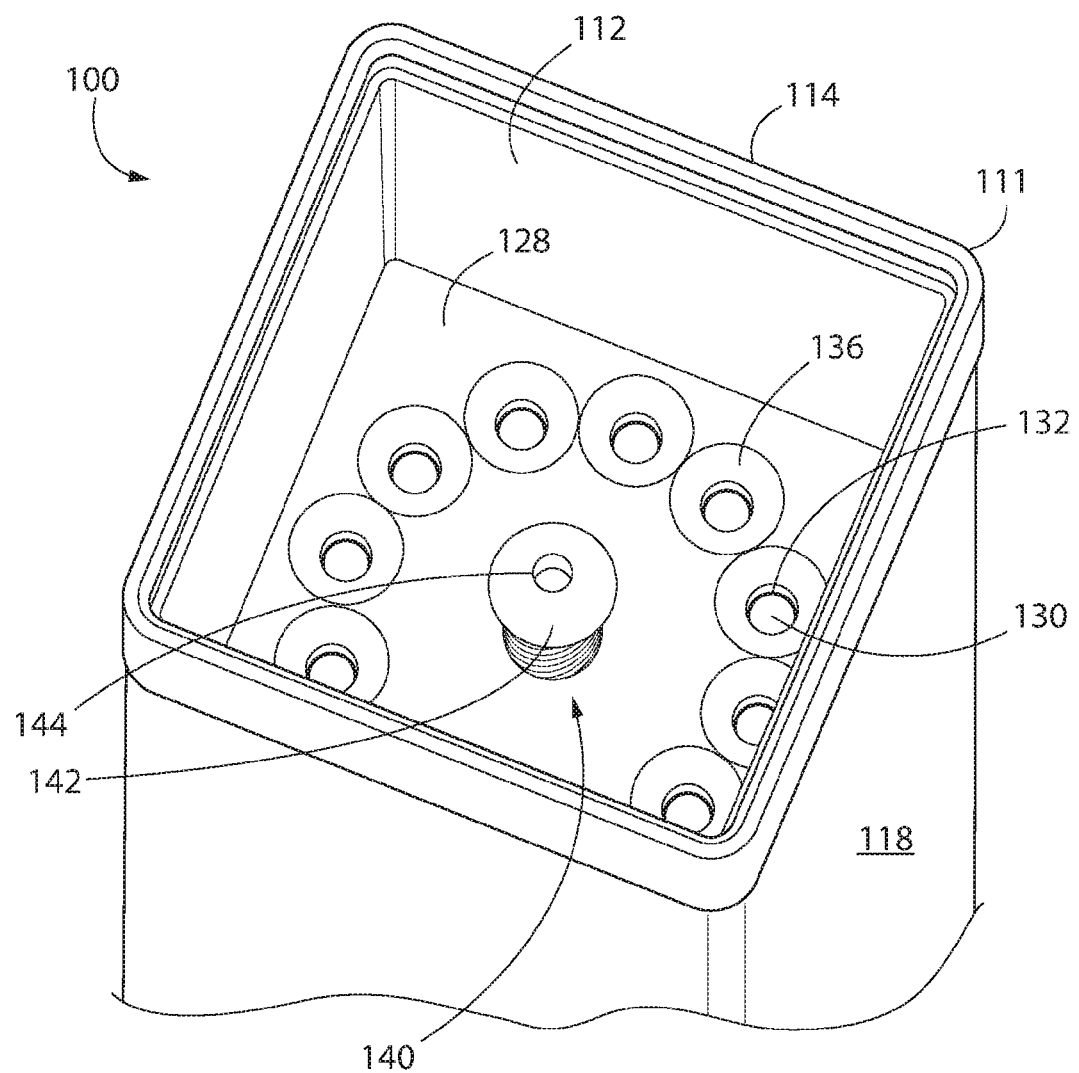
FIG. 7 is a top perspective view showing the inside of the capsule with lid removed, fuel rod storage tubes, and a central drain tube with sealing assembly.
Figure 8:
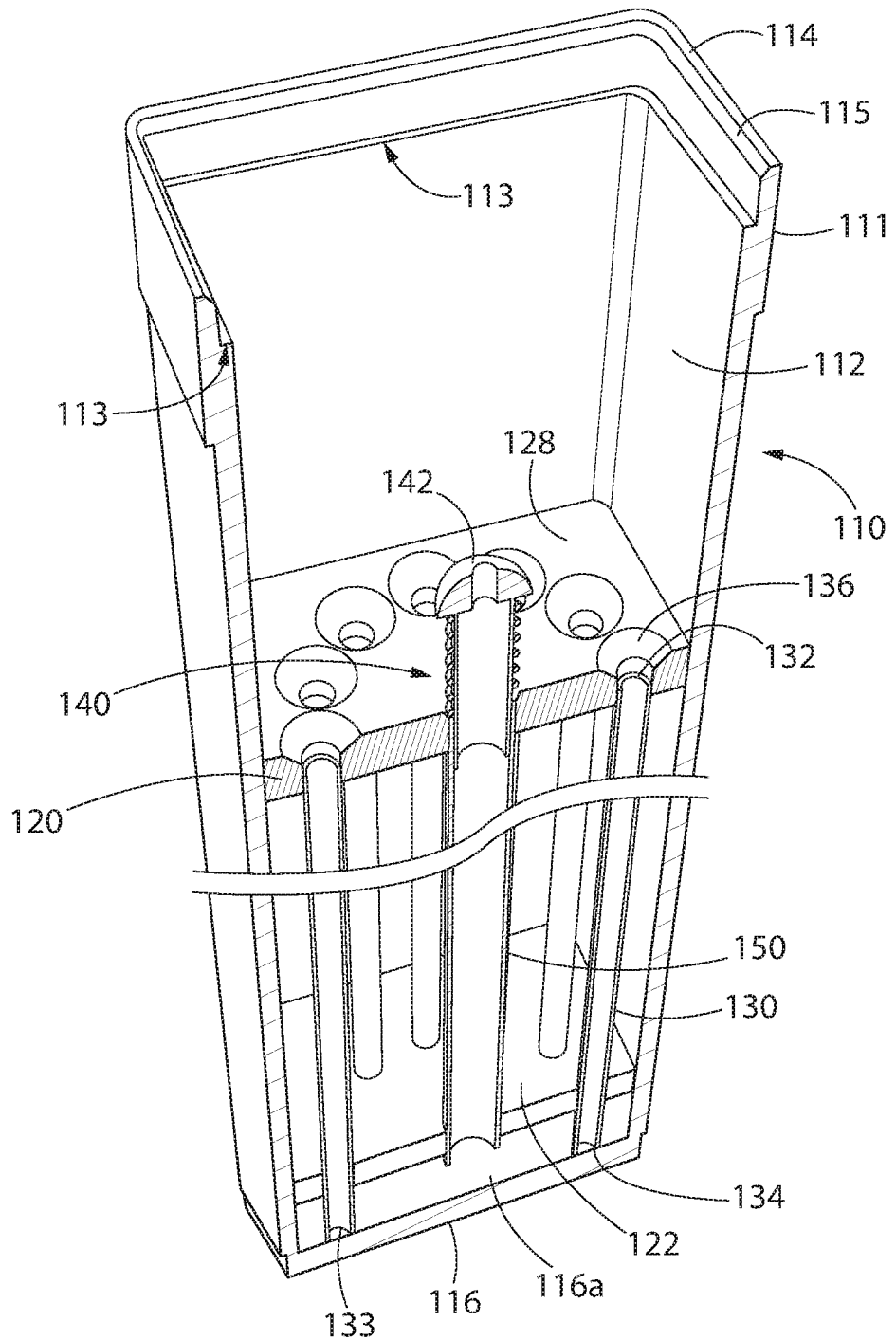
FIG. 8 is a cross-sectional perspective view of the capsule showing the internals.
Figure 14:
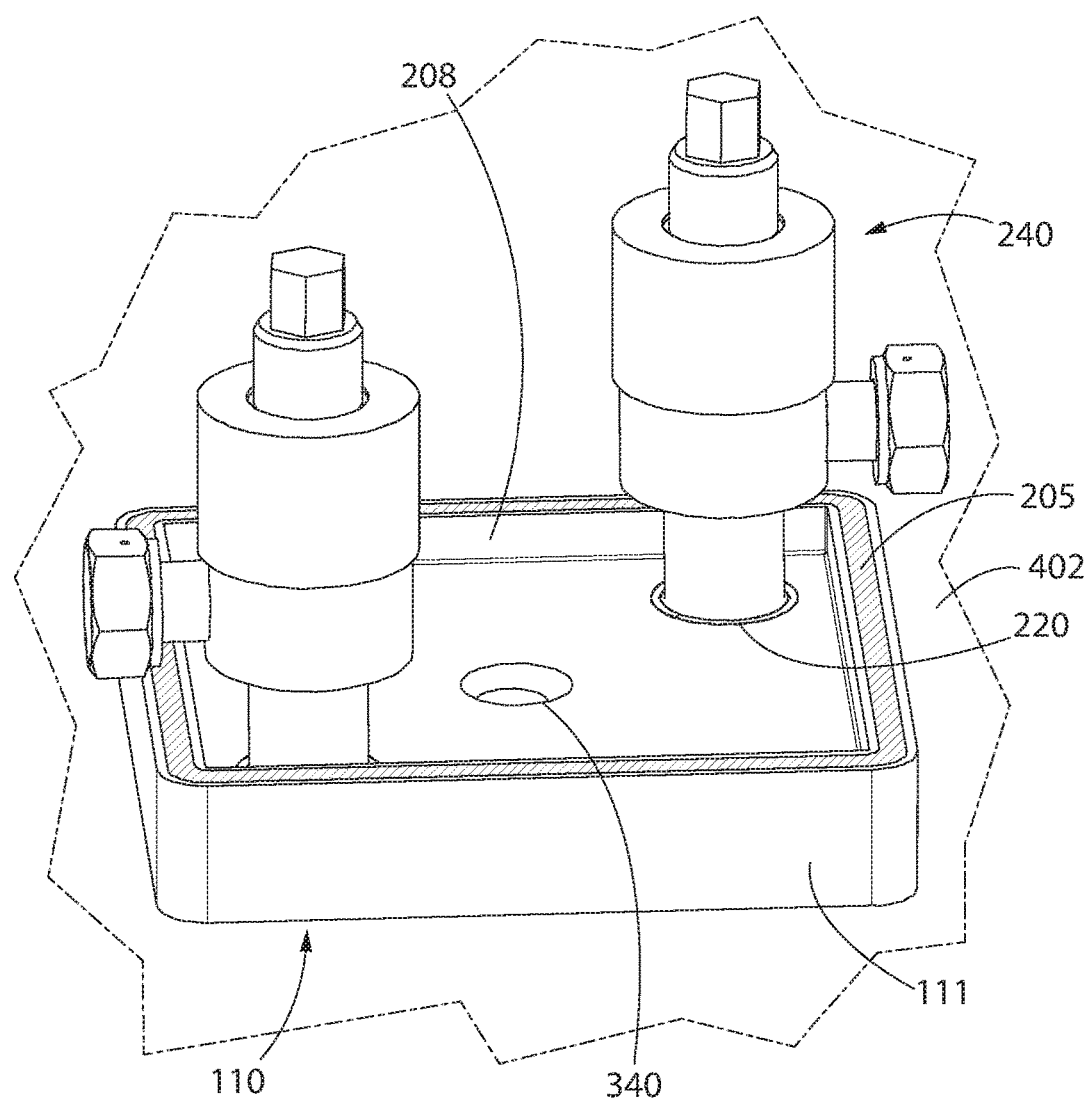
FIG. 14 is an enlarged view from FIG. 11 showing a pair of remote operated valve assemblies installed in the lid of the capsule for gas drying the interior of the capsule.

In one embodiment, the flow conduits 228, 230 each follow a torturous multi-directional path through the lid to prevent neutron streaming. In one configuration, flow conduit 228 includes a vertical section 222a connected to gas supply outlet 224, first horizontal section 228b connected thereto, second horizontal section 228c connected thereto, and second vertical section 228d connected thereto and gas supply port 220. The flow conduit sections 228a-d may be arranged in a rectilinear pattern. Flow conduit 228 includes a vertical section 230a connected to gas return port 222, horizontal section 230b connected thereto, and second vertical section 230c connected thereto and gas return inlet 226. The flow conduit sections 230a-c may also be arranged in a rectilinear pattern. Because the lid 200 has a solid internal structure, the flow conduits may be formed by drilling or boring holes through the lateral sides 206 and top and bottom surfaces 202, 204 of the lid to points of intersection between the conduits as best shown in FIGS. 5 and 15. After formation of the flow conduits, the penetrations 232 in the lateral sides 206 of the lid may be closed using threaded and/or seal welded metal caps applied before mounting and welding the lid 200 to the capsule 110. The penetrations 232 in the bottom surface 204 of the lid may remain open. The gas supply and return port penetrations 232 in the top surface 202 of the lid may be threaded and closed using threaded caps 234 to permit removal and installation of remote valve operating assemblies 240 (RVOAs) for forced gas dehydration of the capsule, as shown in FIGS. 14 and 15.

It should be noted that the gas supply outlet 224 in lid 200 is fluidly coupled to the gas supply outlet extension tube 210. The extension tube 210 compensates for the height of the lid bottom skirt 212 to allow physical coupling of the tube to the sealing assembly 140 when the skirt rests on the top surface 128 of the upper tubesheet 120. In one embodiment, the extension tube 210 and gas supply outlet 224 are centered on the bottom surface 204 of the lid 200. In certain other embodiments, the extension tube may be omitted and the gas supply outlet 224 penetration may be directly coupled to the sealing assembly 140.

A method for storing and drying fuel rods using capsule 110 will now be briefly described. The method may be used for storing intact or damaged fuel rods, either of which may be stored in capsule 110.

The process begins with the top of the capsule 110 being open so that the storage tubes 130 are accessible for loading. The loading operation involves inserting the fuel rods into the storage tubes 130. After the capsule is fully loaded, the lid 200 is attached to the top end 114 and sealed to the capsule. In one preferred embodiment, the lid is sealed welded to the capsule as described elsewhere herein to form a gas tight seal After lid 200 is seal welded to the capsule 110, the interior of the capsule and fuel rods therein may be dried using heated forced gas dehydration (FGD) system such as those available from Holtec International of Marlton, N.J. Commonly owned U.S. Pat. Nos. 7,096,600, 7,210,247, 8,067, 659, 8,266,823, and 7,707,741, which are all incorporated herein by reference in their entireties, describe such systems and processes as noted above.

The remote operated valve assemblies 240 are first installed in the gas supply and gas return ports 220, 222. The valves are then connected to the gas supply and return lines from the FGD system. The next steps, described in further detail herein, include pumping the inert drying gas from the FGD system or source through the gas supply conduit into the cavity 112 of the capsule 110 and into the bottom plenum 124, flowing the gas through each of the storage tubes 130 to dry the fuel rods, collecting the gas leaving the storage tubes in the top plenum 126, and flowing the gas through the gas return conduit back to the FGD source. The process continues for a period of time until analysis of the drying gas shows an acceptable level of moisture removal from the capsule 110.

Referring now to FIGS. 5, 9A, 14, and 15, threaded caps 234 may first be removed from the gas supply and return ports 220 and 222 in the lid 200 which is welded to the capsule 110. A remote valve operating assembly 240 is then threadably coupled to each port 220, 222. The gas supply and return lines from the FGD skid which holds the dehydration system equipment are then fluidly coupled to the valve assemblies. The dehydration and drying process is now ready to commence by pumping the inert and heat drying gas from the FGD system through the capsule 110 to dry the fuel rods in the storage tubes 130, as further described herein.

Gas supplied from the FGD system first flows through the first valve assembly 240 into the lid 200 through the gas supply port 220. The supply gas then flows through flow conduit 228 to the gas supply outlet 224 and then into gas supply outlet extension tube 210. The supply gas enters the sealing assembly 140 and flows downwards through the central drain tube 150 into the bottom plenum 124 of the capsule 110. The gas in the bottom plenum enters the bottom of the fuel rod storage tubes 120 through openings 133 formed in and proximate to the bottom ends 134 of the tubes. The gas flows and rises upwards through each of the storage tubes 120 to dry the damaged fuel rods stored therein. The gas then enters the top plenum 126 above the upper tubesheet 120 beneath the lid 200. From here, the gas leaves the top plenum and enters the gas return inlet 226 in the lid. The gas flows through flow conduit 230 to the gas return port 222 and into the remote valve operating assembly 240 connected thereto. The return gas then flows through the return line back to the FGD system skid to complete the closed flow loop.

Advantageously, the present invention allows drying of multiple damaged fuel rods in the capsule 110 simultaneously instead of on an individual, piece-meal basis. This saves time, money, and operator dosage of radiation.

According to another aspect of the invention, the lid 200 includes a threaded lifting port 340 configured for temporary coupling to a lifting assembly 342 that may be used for moving and transporting the capsule 110 around the fuel pool and loading into transport casks or multi-purpose canisters. The lifting assembly 342 in one embodiment may include a lifting rod 344 including a bottom threaded end 346 for rotatable coupling to the threaded lifting port 340 and an opposite top operating end 348 configured for rigging to equipment such as a crane that may be used to lift and maneuver the capsule 110.

According to yet another aspect of the invention, a lid-based capsule storage system is provided which is configured for holding and supporting a plurality of capsules 110. The capsule storage system includes a cask loading lid 400 which may be configured to retrofit and replace lids used in existing transport or transfer casks used for loading, storing, and transporting undamaged fuel bundles. Using the temporary lid, the existing casks may used to provide radiation shielding during the capsule 110 drying and closure operations described herein.

Referring to FIGS. 11-15, the loading lid 400 can be designed for any dual-purpose metal casks, such as those supplied by Holtec, TNI, or GNS or transfer casks, such as the HI-STRAC used by Holtec International in Marlton, N.J. Loading lid 400 may have multiple mounting cutouts or openings 302 extending completely through the lid each of which are designed to allow insertion of a single capsule 110. The mounting openings 302 are sized smaller than the mounting flange 111 of the capsule 110 so that the flange remains above the top surface 402 of the lid 400. A shoulder 404 is formed beneath each mounting flange 111 between the flange and sidewalls 118 of the capsule which engages the top surface 402 of the lid 400. This allows the capsules to hang from the lid 400 in a vertically cantilevered manner. The top of the capsule 110 therefore sites about 10-15 mm above the lid surface 402 in one representative non-limiting embodiment to enable workers to easily access the top of the capsules to perform the closure operations. The location of the mounting openings 302 can be optimized to allow easy worker access to the capsules during the drying and closure operations.

Figure 16:
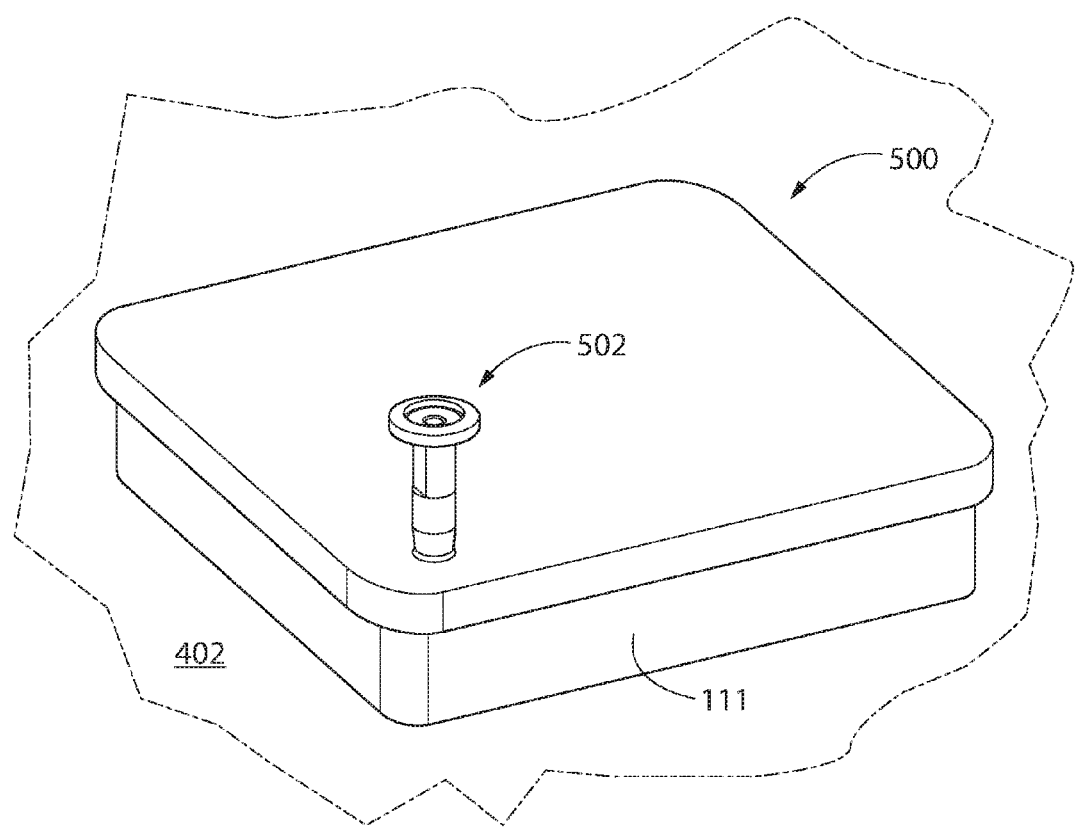
FIG. 16 is a perspective view of a leak testing lid attachable to the capsule.
Figure 17:
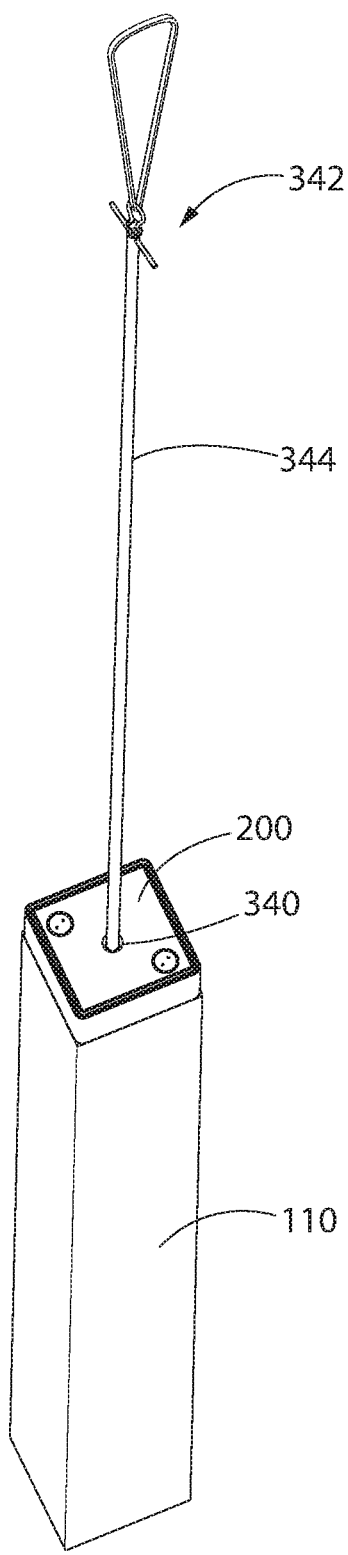
FIG. 17 is a perspective view of the capsule and a lifting assembly.
Figure 18:
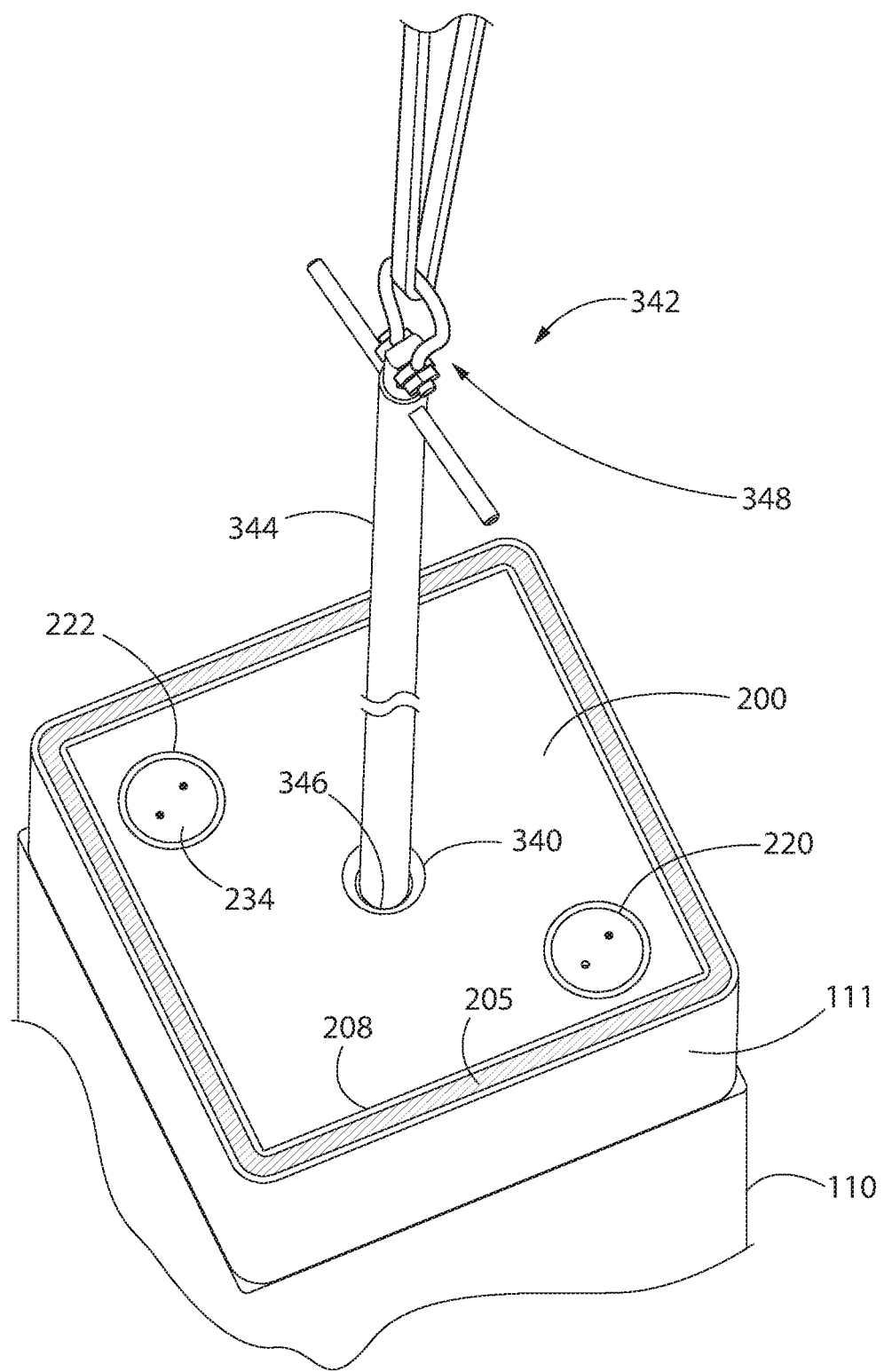
FIG. 18 is an enlarged view thereof of the lid and lifting assembly connection.

According to another aspect of the invention shown in FIG. 16, a leak testing lid 500 is provided which can be coupled and sealed to the mounting flange 111 of the capsule 110. The lid 500 attached to the mounting flange 111 of capsule 110 and includes a piping connection assembly 502 which allows hook-up to leak testing equipment for performance of an integrated leak test of the entire sealed capsule 110.

Although the fuel rod encapsulation capsule is described herein for use with damaged fuel rods, it will be appreciated that the capsule has further applicability for use with intact fuel rods or debris storage as well. Accordingly, the invention is expressly not limited for use with damaged fuel rods alone.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A method for storing and drying nuclear fuel rods, the method comprising:
   providing an elongated vertically oriented capsule including an open top end, a bottom end, and an internal cavity including a plurality of vertically oriented fuel rod storage tubes, the storage tubes each having a transverse cross section configured and dimensioned to hold no more than a single fuel rod;
   inserting a fuel rod into at least one of the storage tubes;
   attaching a lid to the top end of the capsule, the lid including a gas supply flow conduit extending internally between top and bottom surfaces of the lid and a gas return flow conduit extending internally between the top and bottom surfaces of the lid;
   sealing the lid to the capsule to form a gas tight seal;
   pumping an inert drying gas from a source through the gas supply flow conduit of the lid into the cavity of the capsule;
   flowing the gas through each of the storage tubes;
   collecting the gas leaving the storage tubes; and
   flowing the gas through the gas return conduit which exits the lid.

2. The method according to claim 1, wherein the gas flowing through the gas supply conduit is pumped directly to a bottom plenum in the capsule through a central drain tube and bypasses the storage tubes.

3. The method according to claims 2, wherein the storage tubes are vertically oriented and the gas enters a bottom end of each storage tube and leaves through a top end of each storage tube.

4. The method according to claims 3, wherein the collecting step includes flowing the gas leaving the top ends of the storage tubes into a top plenum formed between the top ends of the tubes and the lid.

5. The method according to claim 4, wherein the top plenum is fluidly isolated from the central drain tube.

6. The method according to claim 2, wherein the step of attaching the lid further comprises compressing an axially movable spring-loaded sealing assembly on a top end of the central drain tube with the bottom of the lid, the sealing assembly fluidly coupling the gas supply flow conduit of the lid to the central drain tube.

7. The method according to claim 1, wherein the gas flows through the gas supply and return flow conduits following a multi-directional path through the lid configured to prevent neutron streaming.

* * * * *